Feb. 5, 1929.
H. C. RICKETTS
1,700,908
PROCESS OF TREATING FRUIT AND THE LIKE
Original Filed Feb. 23, 1922    2 Sheets-Sheet 1
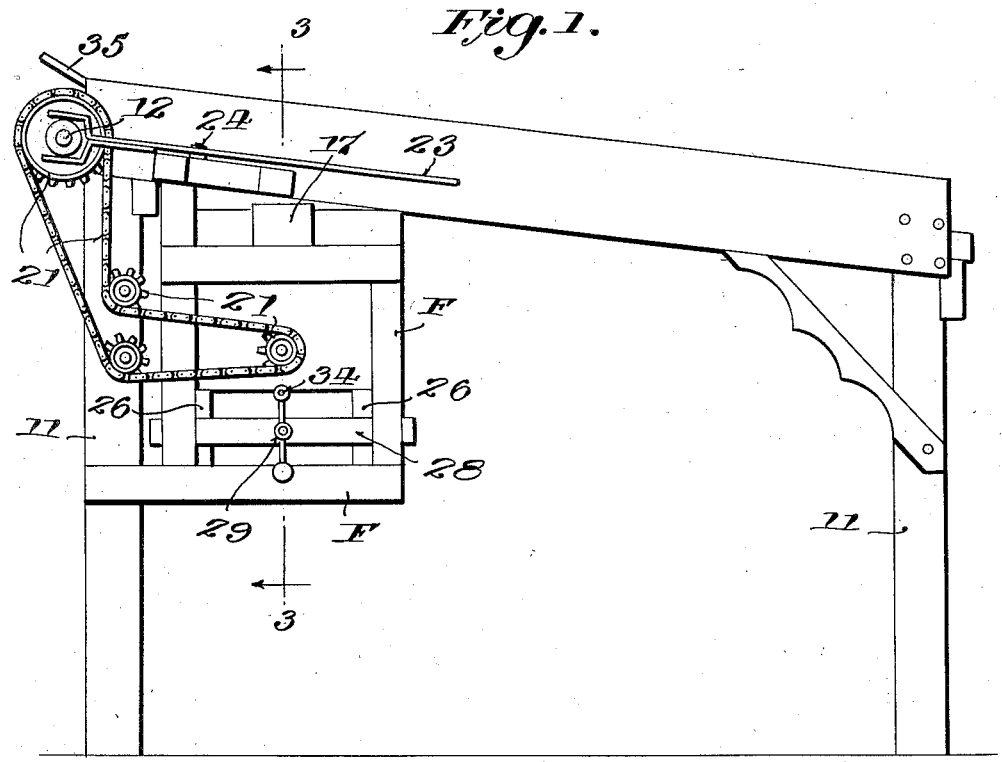
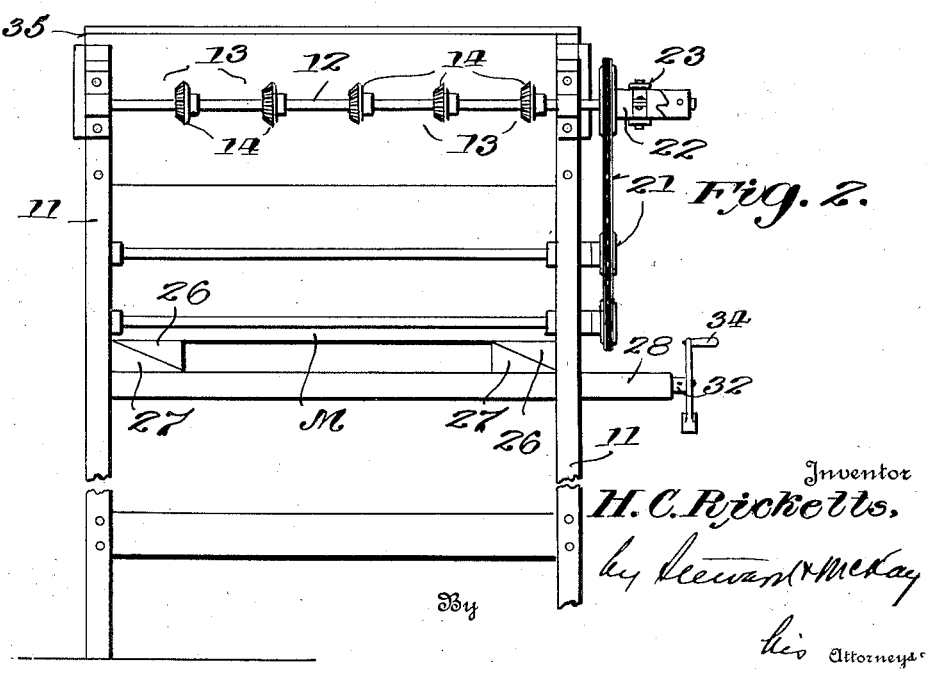

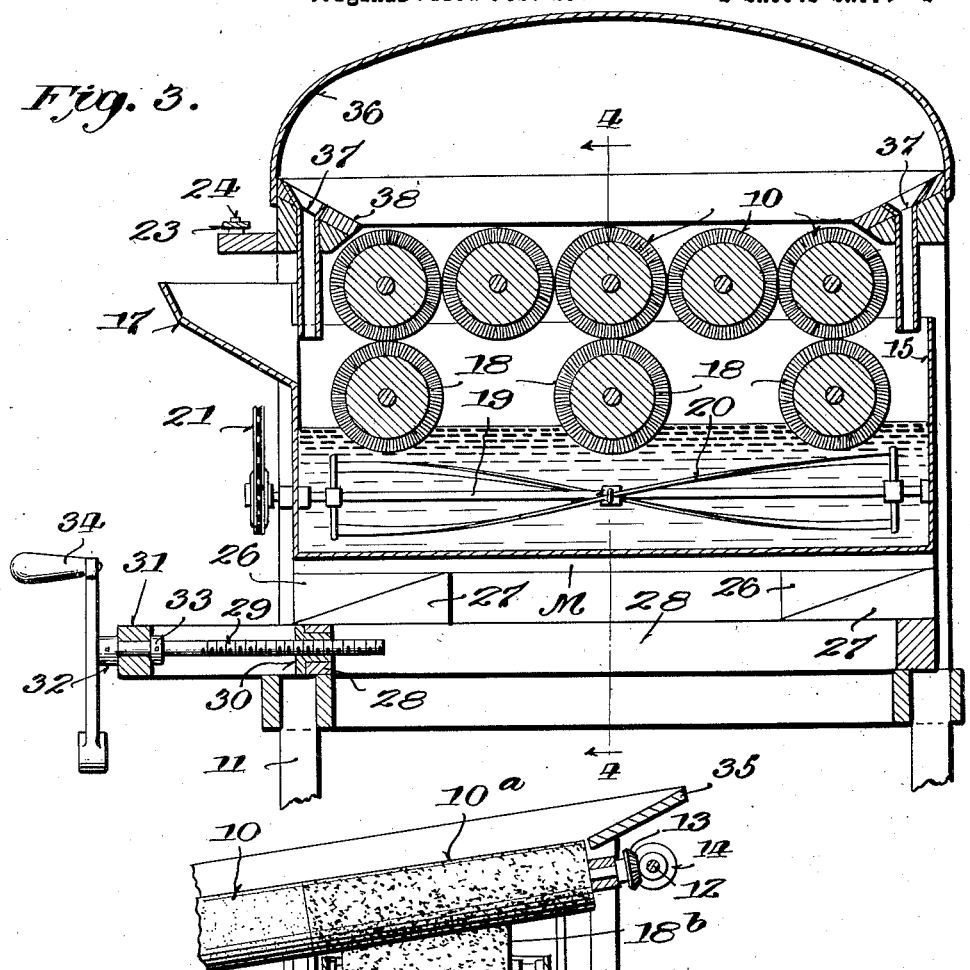

Patented Feb. 5, 1929.

1,700,908

UNITED STATES PATENT OFFICE.

HOMER C. RICKETTS, OF WINTER HAVEN, FLORIDA, ASSIGNOR TO BROGDEX COMPANY, OF WINTER HAVEN, FLORIDA, A CORPORATION OF FLORIDA.

PROCESS OF TREATING FRUIT AND THE LIKE.

Original application filed February 23, 1922, Serial No. 538,424. Divided and this application filed April 13, 1923. Serial No. 631,807.

This invention relates to processes of treating fruit and the like; and it relates more particularly to a process in which fresh fruit is treated with a preservative coating material of such character and under such conditions as to ensure the production on the fruit of a uniform thin protective film-like coating of the desired character.

The invention is concerned more particularly with the treatment of fruit, especially citrus fruit such as oranges, tangerines, grapefruit and lemons, with protective coating material effective, when properly applied, to preserve the fruit for a long time in its original fresh, sound and plump condition without withering or losing flavor, and to protect it against infection by mold or rot organisms. Compositions comprising a waxy material, such as paraffin, in mixture with a liquid vehicle, such as a petroleum distillate, have been found suitable for use in this connection. Mixtures of paraffin and gasoline or other suitable mineral oil solvent, for example, have given satisfactory results.

Owing to the fact that, as commonly used in practice, protective coating compositions comprising paraffin or the like and a liquid vehicle are often in the form of semi-fluid mixtures that are not true solutions or even strictly homogeneous, there is sometimes a tendency for separation of semi-solid matter from the liquid vehicle to occur, which tendency becomes especially pronounced if the mixtures become chilled. Such separation sometimes renders it difficult to apply the compositions to fruit in such manner as to obtain uniform and dependable preservative coating effects. Moreover, this tendency of such compositions to separate or "clump" makes it necessary to apply to the fruit initially more than is normally required to produce the desired type of coating; and while this excess is usually removed to a great extent by the action of the rubbing or polisher apparatus employed in coating the fruit, the result is wasteful and uneconomical use of the composition.

It has been found that the foregoing difficulties can be wholly or largely obviated if care is taken to have the coating composition in a homogeneous creamy condition at the moment of initial application to the fruit. This can be accomplished by thoroughly agitating the mixture and applying it immediately to the fruit without allowing time for separation or clumping to occur.

The novel process will be best understood from a description of a typical, concrete embodiment thereof as carried out, for example, with the aid of suitable apparatus such as that shown in the accompanying drawing, wherein Fig. 1 is a side elevation of the apparatus;
Fig. 2 is an end view of the same;
Fig. 3 is a transverse section on the line 3—3 of Fig. 1, parts being shown in elevation; and
Fig. 4 is a longitudinal central section on the line 4—4 of Fig. 3, parts being shown in elevation.

In the type of apparatus here illustrated, the rubbing or polisher mechanism is of the inclined parallel brush-roll type of which the well known Stebler-Parker polisher is a typical example. In the present instance, the inclined parallel brush rolls of this type of polisher are indicated generally at 10, being suitably journaled at their ends for rotation in bearings provided in the framework 11, and being driven at the proper speed and in the same direction of rotation from driving shaft 12 by means of cooperating bevel gears 13, 14. The rotary brush rolls may be of the usual type in which the rubbing or brushing surfaces are constituted by horse-hair bristles, for example, said rolls cooperating in pairs to provide between each pair a trough-like runway for fruit sloping gently from the upper or receiving end of the polisher to the lower or discharge end. Below the polisher rolls and adjacent the upper or receiving ends thereof is mounted a tank or reservoir 15, holding the fluid or semi-fluid coating and preserving composition 16, which in this instance is assumed to be the protective material to be applied to the fruit or the like and thoroughly rubbed over the surface thereof. In the present example, the tank or pan 15 extends transversely under the entire series of polisher rolls, and is provided at one end with an upwardly and outwardly extending hopper 17 through which coating composition may be supplied to the tank as may be necessary. Means are provided for transferring coating composition from the tank 15 to the polisher rolls 10; and in the arrangement here illustrated, such means comprises one or more applying rolls 18, which in the present example are also brush rolls though much shorter than the long rolls 10. Each of these brush rolls 18 is here shown located vertically below one of the rolls 10, and frictionally engaging the same in such manner as to be rotatable thereby. Each roll 18 is rotatably journaled at its opposite ends in bearings provided in the opposite walls of tank 15, and is arranged to dip into the coating composition contained in said tank. It is not essential that the rolls 18 be in vertical alinement with the respectively cooperating rolls 10; and it is evident that each of the rolls 18 may engage two adjacent rolls 10 since the latter are rotated in the same angular direction.

In practice it is found that the portion of each of the upper rolls 10 that engages a roll 18 may desirably have its brushing surface composed of stiffer bristles than horsehair, and that the brushing surface of each of said rolls 18 also be composed of such stiffer bristles. This is because a more positive driving effect is thus obtainable on the applying rolls 18 than would be the case if the driving engagement were between horse-hair bristle surfaces. Accordingly, such stiffer bristle surfaces, such as fiber bristles for example, are indicated in Fig. 4 at 10$^a$ on the upper roll, and at 18$^b$ on the lower roll 18. In order that the bearings in which the lower or applying rolls 18 are journaled may be horizontally alined, it is desirable that each of the rolls 18 be coned as shown in Fig. 4 for engagement with the inclined cooperating upper rolls 10.

In order to maintain the coating composition thoroughly mixed, and also in order to maintain it of properly fluid consistency, the tank or reservoir 15 is provided with suitable agitating or stirring means. As before pointed out, this is especially desirable where the coating composition is, for example, a mixture of light mineral oil and paraffin in which the paraffin exists partly in solution and partly in suspension in such condition that there is some tendency for the mixture to separate to a greater or less extent upon standing or upon lowering of the temperature. For best results, a composition of this character should be kept thoroughly mixed, homogenized, or emulsified, and in a smooth creamy condition. Typical mixtures of this character are prepared by mixing light mineral oil with molten paraffin in proportions varying from say 20 parts of paraffin and 80 parts of the oil for a comparatively thin mixture to say 60 parts of paraffin and 40 parts of oil for a thick mixture, all parts being by volume. The stirring means employed to accomplish this thorough mixing in accordance with the invention may take various forms, but a particularly desirable form is here illustrated, more particularly in Figs. 3 and 4, where a shaft 10 extends horizontally lengthwise of the tank 15 and is journaled for rotation in suitable bearings in the opposite end walls thereof, said shaft carrying a pair of helical blades 20, and being driven in any suitable manner, as through chain and sprocket mechanism indicated generally at 21. In this instance the chain and sprocket mechanism is adapted to be driven from the aforesaid shaft 12, to which said chain and sprocket mechanism can be connected, or from which it can be disconnected, by means of a suitable sliding sleeve toothed clutch 22, operable by a forked clutch lever 23, which clutch lever can be pivoted at 24 on the side of the machine frame-work as shown. This arrangement makes it possible to run the helical agitator device either intermittently or continuously during operation of the polisher rolls, as may be necessary to ensure maintaining the desired uniformity and consistency of the composition. In addition to serving as a mixer or agitator, the helical agitating and stirring device here shown offers special advantages because, when the device is in operation, it functions also as impeller means to establish and maintain a methodical circulation of the coating composition through the tank in such manner that fresh portions of the supply of coating composition are continually presented to the applying brushes 18 in the form of a stream or current flowing transversely to the axes thereof. It is of course also feasible to provide means for driving the agitator altogether independently of the polisher roll drive.

It is desirable to provide means for adjusting the position of the applying brushes 18 vertically with respect to the cooperating rolls 10 in order that the proper degree of engagement between each pair of rolls 18 and 10 may be attained and the preservative material controllably supplied to the brush rolls 10 in proper predeterminable quantity. In the construction here illustrated, this adjustability is attained by so mounting the tank or reservoir 15 that it, together with the parts mounted therein, can be raised or lowered bodily with respect to the rolls 10. Various means for accomplishing this end may be employed, but in the specific example here given, such adjustability is provided by means of inclined plane or wedge and screw mechanism. The side members M of the framework or cradle 25, by which the tank 15 is movably supported for vertical adjustment in framework F that is secured to the main frame 11 below the brush rolls are provided on their under sides with blocks 26 having inclined lower faces resting upon inclined faces of blocks 27, which latter are secured to a rectangular base frame 28 horizontally reciprocable in framework F transversely of the apparatus. This movement of the rectangular base frame to raise or lower the tank 15 may be effected, for example, by means of a screw 29 working in a threaded bushing 30 in a cross-member of frame 28, said screw being rotatable in a stationary member 31 rigid with the framework F, and being held against longitudinal movement by stop collars 32—33. The screw can be rotated by means of a handle 34 to move the frame 28 in either direction. It is apparent that the described arrangement including the container 15 and the applying roll or rolls 18 mounted therewith as a unit for up and down movement in the supporting and guiding frame F, constitutes broadly means for presenting coating material in adjustable contact with one or more of the polisher brush rolls for transfer of said material to the latter.

In using the apparatus for coating fruit, the fruit is fed to the upper end of the machine over chute board 35 and passes gradually down the sloping runways formed by the cooperating pairs of inclined parallel polisher rolls, the rate of which the fruit travels down the runways being dependent upon the rate at which said rolls are rotated. At the same time, the applying rolls 18 are also rotated by frictional engagement with the rolls 10 with which they respectively coperate, the coating composition 16 being thus transferred by the rolls 18 to rolls 10 at or adjacent their upper ends, and thence to the fruit just as it enters the runways between the polisher rolls. In this way each fruit has a small quantity of the coating composition initially applied to it; and as the fruit progresses down the polisher runways, the composition is uniformly spread in a very thing coating or film all over the surface of the fruit by the rubbing action of the brush rolls. Said rolls may be formed, as by spiral grooving or ribbing (not shown), to favor rotation of the fruit about several different axes. The composition is thus thoroughly rubbed and distributed over the fruit, and upon evaporation of all or most of the solvent, assuming the solvent employed to be volatile, there remains an adherent film coating of paraffin on the fruit which effectively seals the surface thereof in the desired manner. During the described operation, the helical agitator device before described may also be rotated to keep the coating mixture at the creamy and readily fluid consistency best adapted to produce a preservative coating of dependable uniformity. It will be noted that the mixture is transferred immediately to the fruit without having any chance to separate or clump.

The polisher brushes, especially when rotated at fairly high speed, tend to throw off some of the coating composition; and it is therefore desirable in some instances to provide a hood or cover 36 over the polisher rolls to catch such throw-off. This hood may serve also to confine the vapors of the volatile solvent, if such solvent is used and permit of their being led away through an exhaust duct or the like (not shown) for discharge to any convenient point. Drain channels or ducts 37 extending through the side boards 38 downwardly into the upper part of the tank 15 may be provided to return to the tank any of the coating composition or condensed solvent caught by the hood and flowing down upon the side boards 38.

While the specific process hereinabove described has been found to offer important advantages in the practice of the invention, it is to be understood as illustrative and not restrictive. It is also to be understood that reference herein to fruit is to be construed broadly as including not only fruit strictly but also such vegetables as can advantageously be treated in the manner described.

This application is a division of my prior copending application Serial No. 538,424, filed February 23, 1922.

What I claim is:

1. The process of treating fruit which comprises agitating an emulsion-like mixture comprising paraffin and a refined mineral oil to maintain the same of creamy consistency, and immediately applying said mixture to fruit and thoroughly rubbing it over the surface thereof to provide a thin film-like coating, substantially as described.

2. The process of treating fruit which comprises homgenizing a fluid or semi-fluid mixture comprising waxy material and a light mineral oil vehicle employed in such proportions that the components of the mixture tend to separate, and rubbing the homogenized mixture over the surface of fresh fruit before such separation occurs to provide a thin film-like coating.

In testimony whereof I hereunto affix my signature.

HOMER C. RICKETTS.